April 18, 1950 J. G. INGRES 2,504,691
HYDRAULIC BRAKE MECHANISM
Filed Feb. 14, 1947 2 Sheets-Sheet 2
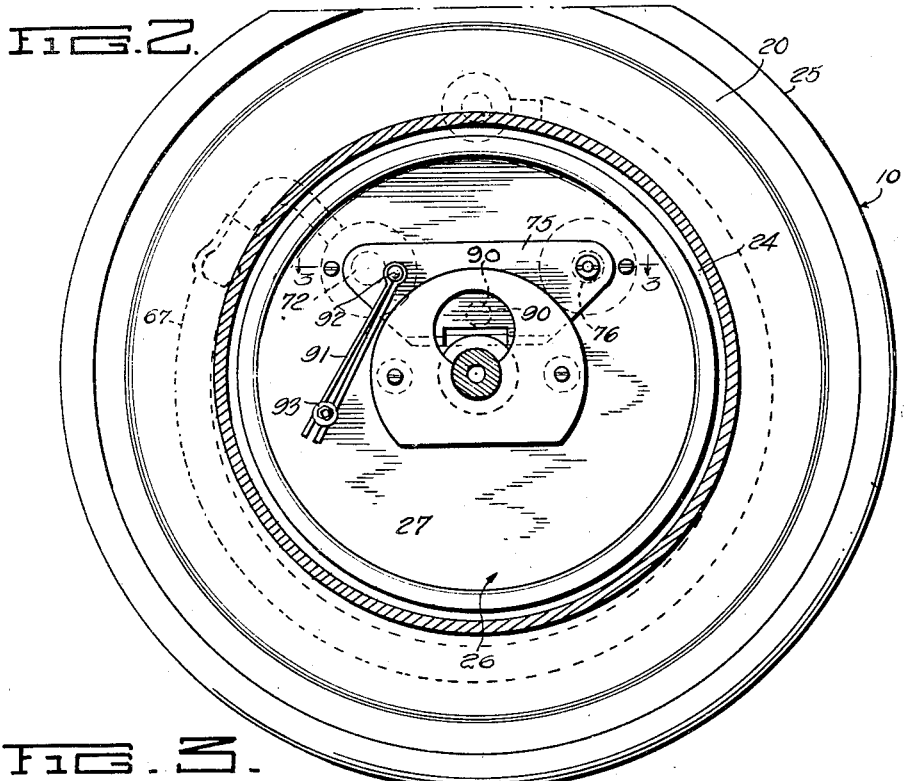
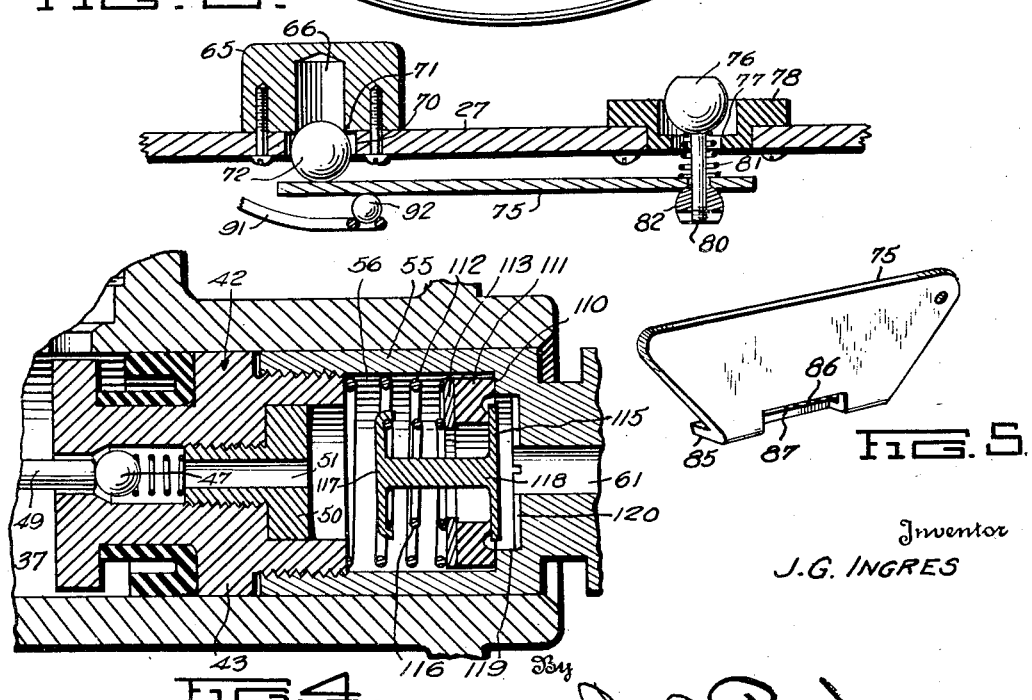
Inventor
J.G. INGRES Patented Apr. 18, 1950

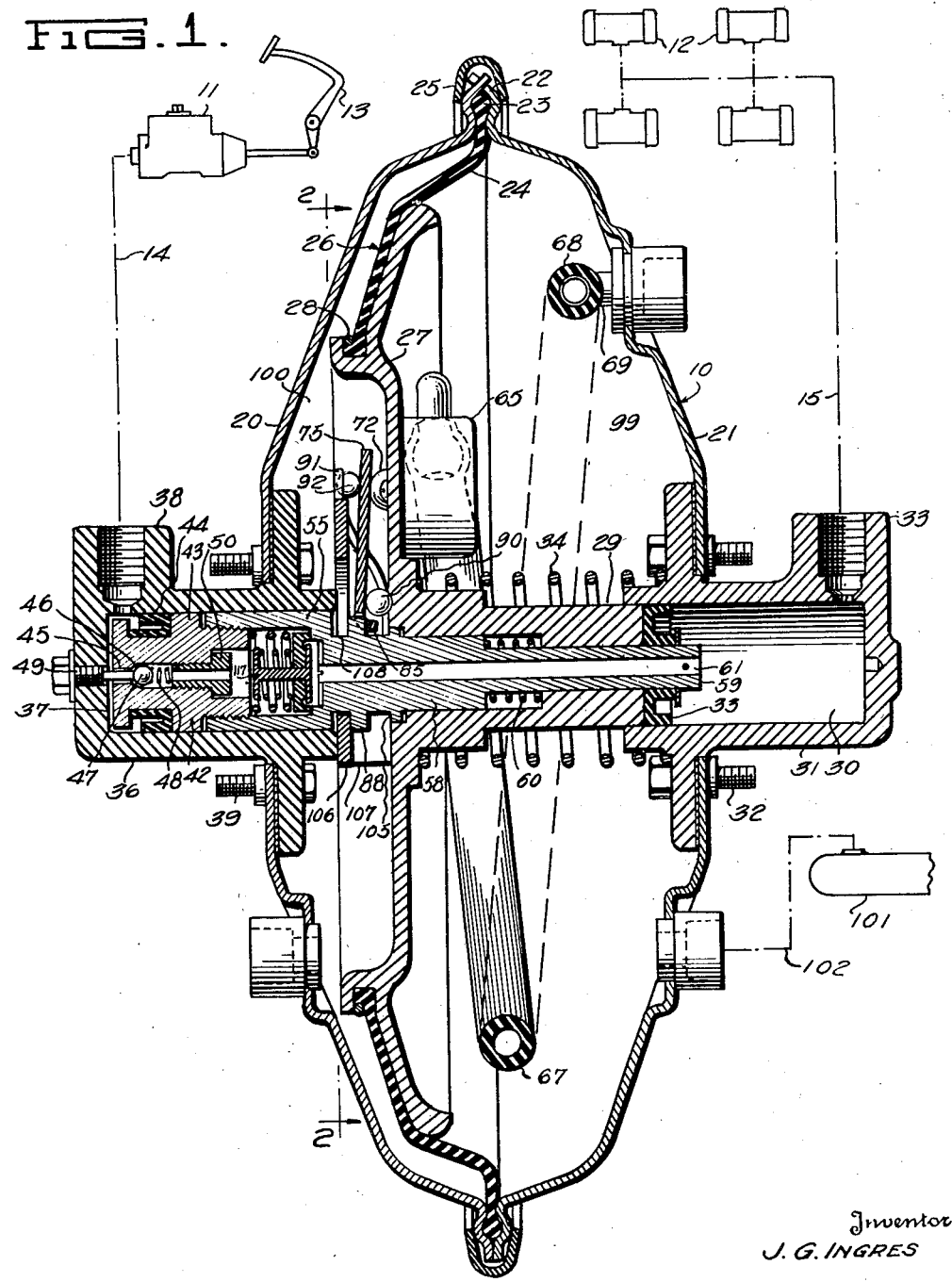

2,504,691

UNITED STATES PATENT OFFICE 2,504,691

HYDRAULIC BRAKE MECHANISM

Jeannot G. Ingres, Richmond, Va., assignor to Empire Electric Brake Company, Newark, N. J., a corporation of New Jersey Application February 14, 1947, Serial No. 728,629

9 Claims. (Cl. 60—54.5)

This invention relates to hydraulic brake mechanisms, and more particularly to a booster brake mechanism of the type shown in the patent to Rudolph J. Klimkiewicz, No. 2,377,699, granted June 5, 1945.

The Klimkiewicz patent shows a highly efficient booster brake mechanism wherein a booster motor is responsive to hydraulic brake fluid displaced from a pedal-operated master cylinder. Such displaced fluid operates a plunger in the booster device to displace fluid from a high pressure hydraulic cylinder, assisted by a plunger operated by the booster motor. The motor partakes of a follow-up action with respect to the plunger which is operated by displaced fluid from the master cylinder and a highly effective and efficient operation is provided wherein the operator performs a predetermined part of the work required in applying the brakes, the proportionate work performed by the operator and by the booster motor depending entirely upon the design of the mechanism.

In devices of this character it has been the common practice to interpose the booster brake mechanism between the master cylinder and the brake cylinders. For reasons well known in the art, it is highly desirable to maintain a residual pressure in the brake system, and this has been done by employing a residual pressure valve mechanism in the outlet end of the master cylinder. In the operation of a booster brake mechanism of the character referred to, atmospheric pressure exists in the piston of the master cylinder when the brake is released, and in applying the brakes, it is necessary for the operator to exert appreciable force on the brake pedal to open the residual pressure valve before displacing fluid from the master cylinder into the booster mechanism.

It is desirable that the residual pressure referred to be retained in the system, and it is desirable to relieve the operator of the necessity of generating appreciable master cylinder pressures to operate the residual pressure valves in order to energize the booster. The latter is important for two reasons. In the first place, if the operator is relieved of the necessity for opening the residual pressure valve, shorter pedals may be employed, and even treadles such as are employed for operating the engine throttle. In the second place, it is necessary during brake operation for the operator to always maintain sufficient pressure on the brake pedal to maintain residual pressures in the brake lines, and this tends to disturb the responsiveness of the booster motors, and particularly their responsiveness in proportion to the force exerted on the brake pedal.

It has been proposed to mount residual pressure valves in the outlet end of the high pressure cylinder of a booster mechanism of this character, and such an arrangement is shown in my co-pending application for hydraulic brake mechanism, Serial No. 482,776, filed April 13, 1943, now Patent No. 2,433,953, granted January 6, 1948. Such an arrangement relieves the operator of having to overcome the resistance of a residual pressure valve associated with the master cylinder, but at the same time possesses other disadvantages. Every booster brake mechanism of this character has what is known as a "cut-in effect," namely, a blind spot, so to speak, between initial displacing of fluid from the master cylinder and the utilization of such fluid for energizing the booster motors. This cut-in effect can be reduced to a negligible minimum, but the provision of a residual pressure valve in the outlet of the high pressure hydraulic cylinder of the booster motor provides what may be termed an artificial cut-in effect, which is disadvantageous. Such arrangement of the residual pressure valve requires a somewhat stronger cut-in valve spring, thus requiring higher pressure in the low pressure end of the device before the motor becomes operative.

An important object of the present invention is to provide a novel booster brake mechanism wherein the disadvantages of placing the residual pressure valve either in the master cylinder or in the outlet of the high pressure hydraulic cylinder of a booster mechanism have been eliminated, and wherein the advantages of placing the residual pressure valve in the outlet end of the high pressure booster cylinder have been retained and other advantages have been gained.

A further object is to provide an improved combination of elements in a mechanism of this character wherein the arrangement of the residual pressure valve permits the use of a weaker cut-in spring, thus providing for a lower cut-in pressure and substantially smoothing out the operation of the mechanism.

A further object is to provide an apparatus of this character wherein the residual pressure is utilized for assisting the parts in moving to their "off" positions when the brake pedal is released.

A further object is to provide a booster mechanism wherein the use of a weaker cut-in spring and the presence of the secondary residual pressure renders the booster unit more responsive to cutting "on" and "off" as the fluid pressure varies.

A further object is to provide such an apparatus wherein both the manually operated and motor actuated pistons in the high pressure hydraulic cylinder are subject to the action of the residual pressure, thus requiring the operator to move the manually operable booster piston against residual pressure, but wherein the substantially reduced area of the manually operable piston which is exposed to residual pressure permits the manual movement of such piston to take place with substantially reduced hydraulic pressure from the master cylinder.

Other objects and advantages of the invention will become apparent during the course of the following description.

In the drawings I have shown one embodiment of the invention. In this showing

Figure 1 is a central longitudinal sectional view through the booster unit, parts being shown in elevation and the master cylinder, brake cylinders and the source of pressure differential for the booster motor being diagrammatically represented, Figure 2 is a section taken substantially on line 2—2 of Figure 1, Figure 3 is an enlarged fragmentary sectional view on line 3—3 of Figure 2, Figure 4 is an enlarged fragmentary sectional view of a portion of the manually operated piston and associated elements showing the arrangement of the residual pressure valve, and Figure 5 is a detail perspective view of the motor-valve operating plate.

Referring to Figure 1 the numeral 10 designates the booster unit as a whole. This unit is connected in a manner to be described between the usual master cylinder 11 and the vehicle wheel cylinders 12. The master cylinder is provided with the usual pedal 13 operable for displacing fluid from the master cylinder through a conduit 14 to the booster mechanism to effect actuation of the latter. High pressure hydraulic fluid is displaced from the booster unit 10 to the wheel cylinders 12 through suitable brake lines 15.

The booster unit comprises a pair of casing sections 20 and 21 provided with peripheral flanges 22 engaging a peripheral bead 23 formed on a flexible diaphragm 24 to be referred to later. A clamping band 25 surrounds the flanges 22 to fix them in proper position and to clamp them in leak-proof engagement against the bead 23.

The diaphragm 24 is one element of a pressure responsive unit indicated as a whole by the numeral 26, this unit being operable by differential pressures established in the manner to be referred to to assist in generating brake-applying hydraulic pressures. The unit 26 further comprises a plate 27 to which the inner periphery of the diaphragm 24 is fixed by means of a clamping ring 28. The plate 27 carries a preferably integral piston sleeve 29 extending into a high pressure chamber 30 formed by a cylinder 31 fixed to the casing section 21 by suitable bolts or the like 32. The piston sleeve 29 is provided with a seal 33 for a purpose which will be apparent, and the cylinder 31 is provided with a suitable outlet 33 communicating with the pipe line 15. A spring 34 is arranged between the plate 27 and the cylinder 31 to tend to move the pressure responsive unit 26 to its "off" position.

At the end of the booster opposite the cylinder 31 a second cylinder 36 is arranged, this cylinder being in axial alignment with the piston sleeve 29 and cylinder 31 and providing in one end thereof a low pressure chamber 37 communicating with the conduit 14 through a suitable tapped connection 38. The cylinder 36 is secured to the casing section 20 by suitable bolts or the like 39.

A piston unit indicated as a whole by the numeral 42 is arranged to be responsive to hydraulic fluid displaced from the master cylinder and to assist the piston sleeve 29 in generating pressures in the chamber 30. The unit 42 comprises a piston 43 operating in the cylinder 36 and provided with a seal 44. The piston 43 is provided with an axial opening 45 having a seat 46 normally engaged by a ball valve 47 urged to closed position by a spring 48. The valve 47 is held slightly off its seat when the brake parts are in the normal position shown in Figure 1, by an axial pin 49 carried by the head of the cylinder 36. The ball 47 and spring 48 are held in position in the piston 43 by a nipple 50 having an axial opening 51 therethrough (Figure 4).

The piston 43 further comprises a coaxial complementary section 55 threaded thereon and cooperating therewith to form a chamber 56, these parts being clearly shown in Figure 4. The piston section 55 has an integral extension 58 projecting through and slidable in the piston sleeve 29, the plunger 58 having a reduced end 59 extending into the chamber 30 through the seal 33, the latter acting both as a seal against the walls of the chamber 30 and as a seal surrounding the piston extension 59. A light spring 60 surrounds the piston extension 59 within the piston sleeve 29 to urge the former toward its "off" position relative to the piston sleeve 29. It will be noted that the plunger 58 is provided throughout its length with an axial opening 61, and accordingly it will be apparent that when the ball 47 is held off its seat, there is direct communication between the chambers 37 and 30 except as controlled by a residual pressure valve described below.

The valve mechanism for energizing the booster motor may be of any desired type, but is preferably of the general type shown in my co-pending application for Booster brake mechanism, Serial No. 590,233, filed April 25, 1945, now Patent No. 2,448,981, granted Sept. 7, 1948. Referring to Figures 1 and 3 the numeral 65 designates a boss carried by the plate 27 and provided with an air passage 66 communicating with one end of a flexible hose 67 arranged spirally within the motor as shown in Figure 1. The opposite end 68 of this hose is connected to a nipple 69 leading through the casing section 21 and communicating with the atmosphere preferably through an air cleaner (not shown). The passage 66 communicates with an opening 70 in the plate 27, and the open end of the passage 66 forms a valve seat 71 engageable with a ball valve 72.

The position of the ball valve 72 is controlled by a rocking plate 75 to be referred to more in detail below. This plate also controls the position of a second ball or similar valve 76 engageable with a seat 77 formed in a thimble 78 carried by the plate 27 (Figure 3). The ball 76 is carried by a stem 80 projecting loosely through the plate 75 and urged away from such plate by a spring 81. A nut 82 is threaded on the stem 80 to adjust the distance between the plate 75 and valve 76.

The valve operating plate 75 is shaped as shown in detail in Figure 5, the top of the plate being relatively wide to fully span the valves 72 and 76, and converging at its side edges to decrease in width. The lower edge of the plate 75 is provided with an inturned flange 85, and the center lower edge of the plate 75 and the flange 85 are notched as at 86, the edge 87 of the flange 85 formed by the notch being engageable by an annular flange 88 formed on the piston section 58, as clearly shown in Figure 1.

The plate 75 rocks on a ball 90 which may be recessed into the plate 27 to maintain it in proper position. A hair pin spring 91 has one end arranged to exert pressure against the valve operating plate 85 through a ball 92, and the opposite end of the spring is connected by a suitable fastening element 93 to the plate 27. It will be noted that the spring 91 exerts a pressure against the plate 75 at a point substantially closer to the ball valve 72 than to the valve 76, the purpose of this being to insure the closing of the normally open valve 76 before the valve 72 opens, for a reason which will become apparent.

The diaphragm 24 and plate 27 divide the motor into a pair of chambers 99 and 100, the former of which is a constant pressure chamber preferably connected to the intake manifold 101 of the motor vehicle engine by a pipe line 102. Accordingly a constant vacuum is maintained in the chamber 99 and when the valve 76 (Figure 3) is open, which is the normal condition, the chamber 100 is also exhausted, the air valve 72 being closed under such conditions.

It will become apparent that the motor is energized by closing the valve 76 and opening the valve 72, in which case there will be a follow-up action of the piston members 29 and 42 relative to each other. In the event of a failure of power in the motor, the valve 115, which is normally seated by very light spring pressure, will open under the influence of manually generated pressure in the chamber 37 and hydraulic fluid from such chamber will flow through the passage 61 into the chamber 30 and thence into the brake lines. Thus the brakes will be applied conventionally by master cylinder pressure.

As is true of other devices of this type, a plate 106 straddles the valve operating mechanism which controls the motor, this plate being provided with opposite arm portions 107 connected to the plate 27. This plate 106 accordingly is fixed with respect to the plate 27 and travels therewith, and engages the inner end of the cylinder 36 to limit movement of the pressure responsive unit of the motor to its "off" position. A portion of the plate 107 operates in a groove 108 formed adjacent the flange 88 to limit relative movement between the piston unit 42 and the plate 106. When the parts are returned to the "off" position, movement of the pressure responsive unit under the influence of the spring 34 and hydraulic pressure in the chamber 30, as will be referred to below, insure movement of the piston unit 42 and the pressure responsive unit of the motor substantially to the "off" position of both such units.

The most important feature of the present invention lies in the provision of the residual pressure valve between the chambers 30 and 37. The residual pressure valve is mounted in the recess 56 (Figure 4) and accordingly travels with the piston unit 42. Under such conditions, residual pressure will be retained not only in the brake cylinders 12 and in the brake lines 15, as in my co-pending application, Serial No. 482,776 (Patent No. 2,433,953) referred to above, but also in the high pressure chamber 30.

The residual pressure valve is shown in detail in Figure 4 of the drawings. One end of the chamber 56 forms a seat 110 engaged by a combined valve and seat 111 urged into engagement with the seat 110 by a coil spring 112, this spring seating at one end against the piston section 43 and at its other end against a washer 113 arranged against the member 111.

A disc valve 115 is engageable against the member 111, the latter thus forming a seat for the valve 115. The valve 115 is urged to closed position by a coil spring 116 having one end engaging the washer 113 and the other end engaging a head 117 carried by the stem 118 of the valve 115. The piston section 58 is provided with a recess 119 into which the disc valve 115 is movable, and the bottom of the recess 119 is grooved as at 120 to prevent the valve 115, when completely open, from closing communication between the chamber 56 and the passage 61.

*Operation*

The spring 112 (Figure 4) is sufficiently strong to seat the valve 111 against predetermined substantial residual pressure maintained in the system, and such pressure holds the valve 115 on its seat. The passage 61 is thus normally cut off from the chamber 56, passage 51, chamber 37 and on to the master cylinder. The master cylinder pressure accordingly is normally that of the atmosphere, while substantial residual pressure is maintained in the passage 61, chamber 30, pipe lines 15 and brake cylinders 12. The air valve 72 (Figure 3) is normally closed and the vacuum valve 76 is normally open, and accordingly balanced subatmospheric pressures will exist in the motor chambers 99 and 100.

When the brake pedal 13 is operated to displace hydraulic fluid from the master cylinder, such fluid flows through pipe line 14 into the low pressure chamber 37. This pressure acts against the adjacent end of the piston section 43 to tend to move it toward the right as viewed in Figure 1. Such movement is opposed by residual pressure in the chamber 30. The pressure in the chamber 37 will increase until the total pressure affecting the adjacent end of the piston section 43 will exceed the total pressure acting on the end of the piston section 59 in the chamber 30. The total area of the piston section 59 exposed to residual pressure in the chamber 30 being very much smaller than the piston area exposed to pressure in the chamber 37, relatively low pressures in the chamber 37 will effect movement of the piston unit 42. The pressure in the chamber 37 will also tend to unseat the disc valve 115, but this valve normally will not be unseated since the residual pressure tending to hold the valve disc on its seat is substantially greater than the initial pressure tending to unseat such valve and the area exposed to residual pressure is greater than the area exposed to pressure in the chamber 37.

It will be apparent that the valve 47 is off its seat when the parts are in the "off" position, but as soon as the total effective pressure in the chamber 37 moves the piston unit 42 to a relatively slight extent, the valve 47 will be seated, thus disconnecting the chambers 30 and 37 from any communication with each other throughout the operation of the brake, wholly independently of the residual pressure valve. Very little movement of the piston unit 42 is necessary for the valve 47 to close and for the motor-control valve mechanism to operate.

Movement of the piston unit 42 to the right in Figure 2 causes the flange 88 (Figure 1) to effect movement of the lower end of the valve operating plate 75 in the same direction, the flange 88 engaging the flange edge 87 of the plate 75. Inasmuch as the spring 91 (Figure 2) is arranged quite close to the valve 72, the end of the plate 75 which controls the valve 76 is relatively easily movable. Accordingly the plate 75 initially rocks on an axis passing through the ball 90 and air valve 72 to close the vacuum valve 76 and thus disconnect the motor chambers 99 and 100. The valve plate 75 will thereafter rock on an axis passing through the ball 90 and vacuum valve 76 to release pressure of the plate 75 against the ball 72. It will be noted that the ball 72 seats against air pressure which tends always to open the valve 72, and in the normal position of the parts, the spring 91 must have sufficient tension to slightly overcome the effect of air pressure and maintain the ball 72 on its seat. The rocking of the valve plate 75 in the manner last referred to accordingly releases spring pressure from the ball 72 and atmospheric pressure in the passage 66 opposite the valve 72 to admit air into the motor chamber 100 to increase the pressure therein.

The pressure responsive unit will thus start to move toward the right in Figure 1, the valve mechanism for the motor thus providing a follow-up action of the pressure responsive unit 26 and its piston sleeve 29 relative to the piston unit 42. Both piston members 29 and 59 accordingly generate pressure in the high pressure chamber 30 to displace fluid therefrom and apply the brakes.

When movement of the pedal 13 is stopped, no more fluid will flow into the chamber 37. A substantially negligible additional movement of the pressure responsive unit 26 will then result in closing the air valve 72 to cut off the admission of air to the motor chamber 100 and thus arrest movement of the parts. When the pedal 13 is released, the operation referred to is reversed, the valve lever 75 being then rocked in a clockwise direction as viewed in Figure 2 to hold the valve 72 on its seat and to open the valve 76. Air thus will be exhausted from the chamber 100 into the chamber 99 to reestablish balanced subatmospheric pressures in the motor chambers.

As distinguished from my co-pending application, Serial No. 482,776 (Patent No. 2,433,953), the high pressure chamber 30 will not be disconnected from the brake lines 15, and the releasing of the parts takes place with the residual pressure assisting both the pressure responsive unit 26 and piston unit 42 in their movement to their "off" positions. Accordingly the spring 34 may be made lighter so as to offer less constant resistance to operation of the parts when the brake is applied. Moreover, the use of the residual pressure, which is substantial, insures immediate movement of the parts back to normal positions substantially in exact synchronism with the movement of the pedal 13. There is accordingly no lagging of the brake-releasing operation relative to movement of the pedal 13.

If, during movement of the parts back to normal position the pressure in the chamber 30 becomes less than pressure in the chamber 37, the valve disc 115 (Figure 4) will open to admit hydraulic fluid through the passage 61 into the chamber 30. This condition is taken advantage of to replenish any leakage of fluid which may occur from the system during continued brake applications. If excessive amounts of fluid should thus be admitted into the chamber 30, or if the pressure in such chamber should rise above the desired residual pressure, the valve 111 (Figure 4) will open to relieve the excess pressure. This valve will close immediately upon the reestablishment of normal pressure conditions.

As previously stated, the plate 106 will insure movement of the parts substantially as a unit almost to the completely "off" positions of the parts. The spring 34, supplemented by residual pressure in the chamber 30, will move the pressure responsive unit 26 to its completely "off" position with the plate 106 engaging the inner end of the cylinder 36. The spring 60 will insure the returning of the piston unit 42 to its completely "off" position shown in Figure 1 with the valve 47 held off its seat by the pin 49.

From the foregoing it will be apparent that the mounting of the residual pressure valve in the piston unit 42 causes it to be effective between the chambers 37 and 30, and this results in the removal of the disadvantages of arranging the residual pressure valve in the master cylinder or between the chamber 30 and pipe line 15. These advantages were discussed above. The arrangement referred to also provides material advantages in itself. For example, it utilizes the residual pressure for assisting in the movement of the parts to the "off" position, thus providing for a faster releasing of the brakes with the use of a lighter return spring 34. It also permits the use of a weaker cut-in spring, the hair pin spring 91 employed in the present instance being only very slightly stronger than need to be normally hold the valve 72 on its seat. Accordingly the cut-in effect is substantially eliminated and the apparatus operates much more smoothly.

In connection with the foregoing it is pointed out that the use of a weaker cut-in spring reduces the gap between the pressures at which the piston unit 42 starts to move and the pressure in the chamber 37 necessary to operate the motor control valves. Accordingly all lumpiness in the operation of the mechanism is eliminated.

While residual pressure opposes manual operation of the piston unit 42, the effect is very much different from the use of the conventional residual pressure valve in the master cylinder. In the latter case, the operator must fully overcome the residual pressure before fluid is displaced from the master cylinder. In the present case, the effective piston area in the chamber 37 is so much greater than the effective area of the piston section 59 in the chamber 30 that very little pedal effort is necessary to effect manual movement of the piston unit 42.

Therefore, the operation of the mechanism may be initiated with very little effort, and the maintenance of more uniform pressures in the chamber 30 during irregular brake applications makes the response of the motor to operation of its control valves more sensitive than in prior constructions.

The arrangement of the residual pressure valve in the piston unit 42 renders the device as a whole far more compact than if the valve were arranged between the chamber 30 and pipe line 15. In fact, the device is just as compact as it would be without the use of the residual pressure valve in the piston unit 42. So far as the operativeness of the mechanism is concerned, the residual pressure valve could be connected in an external line between the chambers 37 and 30, but the arrangement shown is highly practicable, it merely being necessary to make the parts 43 and 55 separate and connecting them together to form the chamber 56 for receiving the residual pressure valve.

I claim:

1. In a hydraulic braking system having a master cylinder and a wheel cylinder for applying the brakes, a booster unit comprising a low pressure chamber communicating with the master cylinder, a high pressure chamber communicating with the wheel cylinder, a low pressure piston in said low pressure chamber operable by fluid displaced thereinto from the master cylinder, a high pressure piston in said high pressure chamber, a differential fluid pressure motor connected to said high pressure piston, valve means controlled by movement of said low pressure piston for energizing said motor whereby said high pressure piston generates a relatively high pressure in said high pressure chamber, said booster unit having a passage wholly independent of the master cylinder connecting said low pressure chamber to said high pressure chamber, and a residual pressure valve device in said passage predetermining differential pressures in said high pressure chamber and said low pressure chamber necessary for the flow of fluid therebetween when said low pressure piston is in its "off" position.

2. In a hydraulic braking system having a master cylinder and a wheel cylinder for applying the brakes, a booster unit comprising a low pressure chamber communicating with the master cylinder, a high pressure chamber communicating with the wheel cylinder, a low pressure piston in said low pressure chamber operable by fluid displaced thereinto from the master cylinder, a high pressure piston in said high pressure chamber, a differential fluid pressure motor connected to said high pressure piston, valve means controlled by movement of said low pressure piston for energizing said motor whereby said high pressure piston generates a relatively high pressure in said high pressure chamber, said booster unit having a passage wholly independent of the master cylinder connecting said low pressure chamber to said high pressure chamber, a residual pressure valve device in said passage predetermining differential pressures in said high pressure chamber and said low pressure chamber necessary for the flow of fluid therebetween, and means operable independently of said residual pressure valve device for closing said passage upon initial movement of said low pressure piston from its "off" position.

3. In a hydraulic braking system having a master cylinder and a wheel cylinder for applying the brakes, a booster unit comprising a low pressure chamber communicating with the master cylinder, a high pressure chamber communicating with the wheel cylinder, a low pressure piston in said low pressure chamber operable by fluid displaced thereinto from the master cylinder, a high pressure piston in said high pressure chamber, a differential fluid pressure motor connected to said high pressure piston, valve means controlled by movement of said low pressure piston for energizing said motor whereby said high pressure piston generates a relatively high pressure in said high pressure chamber, said booster unit having a passage wholly independent of the master cylinder connecting said low pressure chamber to said high pressure chamber, a residual pressure valve device in said passage predetermining differential pressures in said high pressure chamber and said low pressure chamber necessary for the flow of fluid therebetween, a flow-control valve operable independently of said residual pressure valve device for controlling communication through said passage and biased to closed position, and means operable when said low pressure piston is in its "off" position for opening said flow-control valve.

4. In a hydraulic brake system having a master cylinder and a wheel cylinder, a booster unit comprising a low pressure cylinder communicating with the master cylinder, a high pressure cylinder coaxial with said low pressure cylinder and communicating with the wheel cylinder, a first piston in said low pressure cylinder movable by fluid displaced thereinto from the master cylinder, said first piston having an axially projecting plunger portion extending into said high pressure cylinder, a second piston operable in said high pressure cylinder, a differential fluid pressure motor connected to said second piston, control valve mechanism operable by said first piston for energizing said motor whereby said second piston and said plunger portion of said first piston cooperate to generate relatively high pressures in said high pressure cylinder, said first piston being provided with an axial passage therethrough opening at its ends respectively into said low pressure cylinder and said high pressure cylinder, and valve means in said passage requiring a predetermined pressure to permit return of fluid from said high pressure cylinder to said low pressure cylinder when said first piston is in its "off" position.

5. In a hydraulic brake system having a master cylinder and a wheel cylinder, a booster unit comprising a low pressure cylinder communicating with the master cylinder, a high pressure cylinder coaxial with said low pressure cylinder and communicating with the wheel cylinder, a first piston in said low pressure cylinder movable by fluid displaced thereinto from the master cylinder, said first piston having an axially projecting plunger portion extending into said high pressure cylinder, a second piston operable in said high pressure cylinder, a differential fluid pressure motor connected to said second piston, control valve mechanism operable by said first piston for energizing said motor whereby said second piston and said plunger portion of said first piston cooperate to generate relatively high pressures in said high pressure cylinder, said first piston being provided with an axial passage therethrough opening at its ends respectively into said low pressure cylinder and said high pressure cylinder, valve means in said passage requiring a predetermined pressure to permit return of fluid from said high pressure cylinder to said low pressure cylinder, a flow-control valve controlling communication through said passage independently of said valve means, and means for holding said flow-control valve in open position when said first piston is in its "off" position.

6. In a hydraulic brake system having a master cylinder and a wheel cylinder, a booster unit comprising a low pressure cylinder communicating with the master cylinder, a high pressure cylinder coaxial with said low pressure cylinder and communicating with the wheel cylinder, a first piston in said low pressure cylinder movable by fluid displaced thereinto from the master cylinder, said first piston having an axially projecting plunger portion extending into said high pressure cylinder, a second piston operable in said high pressure cylinder, a differential fluid pressure motor connected to said second piston, control valve mechanism operable by said first piston for energizing said motor whereby said second piston and said plunger portion of said first piston cooperate to generate relatively high pressures in said high pressure cylinder, said first piston being provided with an axial passage therethrough opening at its ends respectively into said low pressure cylinder and said high pressure cylinder, and a residual pressure valve device carried by and arranged in said first piston and comprising a pair of oppositely opening valve elements biased to closed position and predetermining the differential pressures necessary in said high pressure cylinder and said low pressure cylinder for the flow of fluid therebetween when said first piston is in its "off" position.

7. In a hydraulic brake system having a master cylinder and a wheel cylinder, a booster unit comprising a low pressure cylinder communicating with the master cylinder, a high pressure cylinder coaxial with said low pressure cylinder and communicating with the wheel cylinder, a first piston in said low pressure cylinder movable by fluid displaced thereinto from the master cylinder, said first piston having an axially projecting plunger portion extending into said high pressure cylinder, a second piston operable in said high pressure cylinder, a differential fluid pressure motor connected to said second piston, control valve mechanism operable by said first piston for energizing said motor whereby said second piston and said plunger portion of said first piston cooperate to generate relatively high pressures in said high pressure cylinder, said first piston being provided with an axial passage therethrough opening at its ends respectively into said low pressure cylinder and said high pressure cylinder, valve means in said passage requiring a predetermined pressure to permit return of fluid from said high pressure cylinder to said low pressure cylinder, a flow-control valve for controlling communication through said axial passage independently of said valve means and biased to closed position, and stationary means engageable with said flow-control valve to open it when said first piston is in its "off" position.

8. In a hydraulic brake system having a master cylinder and a wheel cylinder, a booster unit comprising a low pressure cylinder communicating with the master cylinder, a high pressure cylinder coaxial with said low pressure cylinder and communicating with the wheel cylinder, a first piston in said low pressure cylinder movable by fluid displaced thereinto from the master cylinder, said first piston having an axially projecting plunger portion extending into said high pressure cylinder, a second piston operable in said high pressure cylinder, a differential fluid pressure motor connected to said second piston, control valve mechanism operable by said first piston for energizing said motor whereby said second piston and said plunger portion of said first piston cooperate to generate relatively high pressures in said high pressure cylinder, said first piston being provided with an axial passage therethrough opening at its ends respectively into said low pressure cylinder and said high pressure cylinder, valve means in said passage requiring a predetermined pressure to permit return of fluid from said high pressure cylinder to said low pressure cylinder, a flow-control valve in said passage between said valve means and said low pressure chamber and biased to closed position, and a stationary member arranged in said low pressure cylinder axially of said first piston and engageable with said flow-control valve to open it when said first piston is in its "off" position.

9. In a hydraulic brake system having a master cylinder and a wheel cylinder, a booster unit comprising a low pressure cylinder communicating with the master cylinder, a high pressure cylinder communicating with the wheel cylinder, a first piston operable in said low pressure cylinder and movable by fluid displaced thereinto from the master cylinder, a second piston operable in said high pressure cylinder, a differential fluid pressure motor connected to said second piston, a follow-up control valve mechanism for said motor operable by said low pressure piston, said low pressure piston having an axially projecting plunger portion extending through said second piston into said high pressure cylinder whereby said second piston and said plunger portion of said first piston cooperate to generate relatively high pressures in said high pressure cylinder, said first piston having an axial passage therethrough communicating at its ends respectively with said low pressure cylinder and said high pressure cylinder and having an enlargement intermediate its ends, a residual pressure valve device arranged in the enlargement in said axial passage and comprising oppositely opening valve elements normally biased to closed position, a valve seat formed in said axial passage between said low pressure cylinder and said residual pressure valve device, a flow-control valve engaging said seat and biased to closed position, and means for opening said flow-control valve when said first piston is in its "off" position.

JEANNOT G. INGRES.

REFERENCES CITED

The following references are of record in the file of this patent:

UNITED STATES PATENTS

| Number | Name | Date |
|---|---|---|
| 2,332,340 | Price | Oct. 19, 1943 |
| 2,353,755 | Price | July 18, 1944 |
| 2,365,471 | Ingres | Dec. 19, 1944 |